United States Patent
Liu et al.

(10) Patent No.: US 8,448,216 B2
(45) Date of Patent: May 21, 2013

(54) METHOD AND APPARATUS FOR ORCHESTRATING POLICIES IN SERVICE MODEL OF SERVICE-ORIENTED ARCHITECTURE SYSTEM

(75) Inventors: Xin Peng Liu, Beijing (CN); Yu Chen Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 1416 days.

(21) Appl. No.: 11/762,894

(22) Filed: Jun. 14, 2007

(65) Prior Publication Data

US 2008/0066189 A1 Mar. 13, 2008

(30) Foreign Application Priority Data

Jun. 23, 2006 (CN) .......................... 2006 1 0093193

(51) Int. Cl.
*G06F 21/00* (2006.01)
(52) U.S. Cl.
USPC ...... 726/1; 726/4; 726/28; 380/201; 713/158; 713/171; 709/223; 709/224; 455/418; 455/406; 705/26.1; 705/28
(58) Field of Classification Search
USPC .......................................................... 726/1, 28
See application file for complete search history.

(56) References Cited

U.S. PATENT DOCUMENTS

| | | | |
|---|---|---|---|
| 7,113,900 B1 * | 9/2006 | Hunt et al. ....................... 703/13 |
| 7,904,909 B1 * | 3/2011 | Reiner et al. ................... 718/104 |
| 2002/0083371 A1 * | 6/2002 | Ramanathan et al. .......... 714/37 |
| 2003/0120817 A1 | 6/2003 | Ott et al. |
| 2003/0144894 A1 * | 7/2003 | Robertson et al. ................. 705/8 |
| 2004/0093381 A1 * | 5/2004 | Hodges et al. ................ 709/204 |
| 2004/0098606 A1 * | 5/2004 | Tan et al. ....................... 713/200 |
| 2004/0103339 A1 * | 5/2004 | Chalasani et al. ................ 714/4 |
| 2004/0117407 A1 * | 6/2004 | Kumar et al. ................. 707/200 |
| 2004/0243849 A1 * | 12/2004 | Blackburn et al. ............ 713/201 |
| 2005/0080914 A1 * | 4/2005 | Lerner et al. .................. 709/230 |
| 2005/0278431 A1 * | 12/2005 | Goldschmidt et al. ........ 709/207 |
| 2005/0289244 A1 | 12/2005 | Sahu et al. |
| 2006/0069717 A1 | 3/2006 | Mamou et al. |
| 2007/0033273 A1 * | 2/2007 | White et al. ................... 709/223 |
| 2007/0061125 A1 * | 3/2007 | Bhatt et al. ...................... 703/20 |
| 2007/0124797 A1 * | 5/2007 | Gupta et al. ...................... 726/1 |
| 2007/0160079 A1 * | 7/2007 | Han et al. ....................... 370/465 |
| 2007/0271618 A1 * | 11/2007 | Chao et al. ....................... 726/27 |

OTHER PUBLICATIONS

Schmidt, "Model-Driven Engineering", IEEE Computer, Feb. 2006 (vol. 39, No. 2) pp. 25-31.*

* cited by examiner

*Primary Examiner* — Morshed Mehedi
(74) *Attorney, Agent, or Firm* — Lee Law, PLLC; Christopher B. Lee

(57) ABSTRACT

Policies are orchestrated in a service model of service-oriented architecture system, wherein the service model includes at least a plurality of service components and dependency relationships among the plurality of service components, and at least one of the plurality of service components is subject to specified policies. Vertical policy orchestration is performed on each of the plurality of service components in the service model to obtain the effective policies of the service component. Horizontal policy orchestration is performed on an application domain basis to obtain the effective policies of the plurality of service components in each application domain.

17 Claims, 3 Drawing Sheets

METHOD AND APPARATUS FOR ORCHESTRATING POLICIES IN SERVICE MODEL OF SERVICE-ORIENTED ARCHITECTURE SYSTEM

CROSS-REFERENCE TO RELATED APPLICATION

This application is related to application Ser. No. (IBM Docket CN920060034US1), entitled "Method and Apparatus for Transforming Web Service Policies From Logical Model to Physical Model", filed concurrently herewith and assigned to the assignee of the present invention.

TECHNICAL FIELD

The invention relates to the field of data processing, and particularly, relates to a method and apparatus for orchestrating policies in a service model of a Service-Oriented Architecture (SOA) system.

BACKGROUND

As web service applications have become more complex, the first generation web service architecture no longer adequately accommodates development requirements for current web services. Thus, a Service-Oriented Architecture (SOA) has been proposed. SOA establishes the concept that a web service system may be composed of a series of subsystems or services that are separate but that cooperate with each other. Such a structure enables the services to be separated. Each service needs only inform other services of its declared interface. Therefore, SOA allows corporation business flows to be created that are only loosely coupled. Where SOA concepts are used, a web service system may be formed by web services executed in remote and different domains, replacing the conventional hierarchical structure of a system with service flows across various business areas.

In order to satisfy a user's requirements for quality of service, a SOA system may be required to comply with a Service Level Agreement (SLA) that defines the level of service expected by the user. Web service policies are used to describe the requirements and abilities of a web service in its interactions with other web services or consumers and are important in setting up Service Level Agreements.

The term policy relates to non-functional, characteristics, such as a variety of fields of security, reliability, transaction, privacy, and so on, corresponding to the functional elements in an SOA system. Similarly, a way to express policies is not limited to the expression of common policies or security policies. A web service policy generally includes a Policy Framework (WS-Policy) document that defines the syntax for expressing the policies of a web service; a Policy Attachment (WS-Policy Attachment) document that defines how to attach these policies to a web service; a General Policy Assertions (WS-Policy Assertions) and a set of Security Policy Assertions (WS-Security Policy).

The Web Services Policy Framework (WS-Policy) defined by IBM, BEA, Microsoft and others is the de facto standard for Web Services policy. It provides a common model and corresponding syntax to describe policies of a web service. WS-Policy is intended to allow for extensibility. That is to say, WS-Policy defines a base set of constructs that can be used and extended by other web services specifications to describe a broad range of service requirements and capabilities (the non-functional part). Based on WS-Policy, a set of standards have been defined for different perspectives of a system, including Web Service Reliability Messaging Policy (WS-RM Policy), Web Service Security Policy (WS-Security Policy), Web Service Atomic Transaction (WS-Atomic Transaction), Web Service Policy Assertions (WS-Policy Assertions), etc. Users can also define policy languages based on WS-Policy and related standards for their needs.

Currently, most of the attention of system developers is focused on runtime policy enforcement. However, design-time policy enforcement and validation is important to validate the conformance of services before they are put into production. For example, one currently available Policy Manager provides a tool for validating compliance to a WS-I (Web Services Interoperability) Organization basic summary containing implementation principles for kernelled web service specifications, which are a set of requirements defining how to apply these specifications to develop co-operable web services, documents integrity, syntactic validity of single service. However, this tool concentrates on the validation of correctness, integrity and validity of policies for a single service.

There is no known method and tool for validating correctness and consistency of service policies at the design time of a SOA system, nor is there any known tool for generating framework of non-functional infrastructure for the SOA system.

SUMMARY OF THE INVENTION

The present invention orchestrates policies in a service model of a service-oriented architecture system, such that the validation of correctness and consistency of policies for a plurality of service components of an SOA system can be achieved at design time, thereby facilitating the correct design of a SOA system.

According to an aspect of the present invention, there is provided a method for orchestrating policies in a service model of a service-oriented architecture system, wherein the service model comprises a plurality of service components and the dependency relationships among said plurality of service components. At least one of the plurality of service components has specified policies. Vertical policy orchestration is performed on each of the plurality of service components in the service model to obtain the effective policies of the service component. Horizontal orchestration is performed on the effective policies of the plurality of service components per application domain.

According to another aspect of the present invention, there is provided an apparatus for orchestrating policies in a service model of a service-oriented architecture system. A vertical policy orchestration unit performs vertical policy orchestration on each of the plurality of service components in the service model to obtain the effective policies of the service component. A horizontal policy orchestration unit performs horizontal orchestration on the effective policies of the plurality of service components per application domain.

BRIEF DESCRIPTION OF THE DRAWINGS

It is believed that the above-mentioned features, advantages, and objectives of the present invention can be better understood through the following detailed description when taken in conjunction with the drawings.

DETAILED DESCRIPTION

Figure 1:
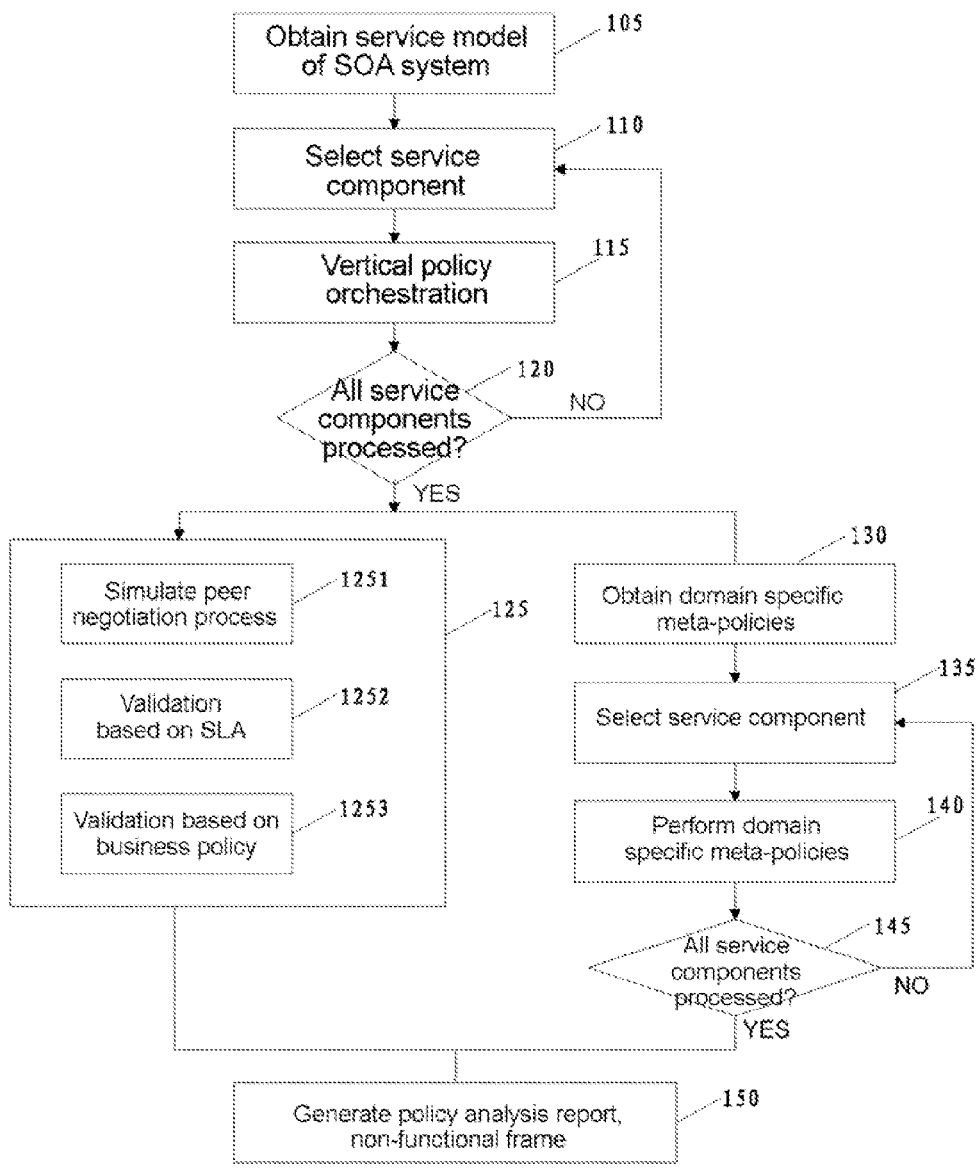
FIG. 1 is a flow chart illustrating a method for orchestrating policies in a service model of a service-oriented architecture system according to an embodiment of the present invention.

FIG. 1 is a flow chart illustrating a method for orchestrating policies in a service model of a service-oriented architecture system according to an embodiment of the present invention. As shown in FIG. 1, at Step 105, a service model of a SOA system is obtained. The service model comprises a plurality of service components and the dependency relationships among the service components.

In the service model each service component, can implement one or more services to be provided by a service provider. Each of the services is specified in detail by a WSDL (Web Service Definition Language) description. Likewise, each logical service component can also invoke other services as a service consumer.

In a service model of the SOA system, dependency relationships among the service components are represented by directional links, shown as arrows. A directional link from one service component to another service component represents the direction of service invocation from service consumer to service provider.

Further, in a service model of a SOA system, a system or a sub-system may sometimes be defined. A system or a sub-system is a set of service components with a virtual boundary and relationship. A system may contain one or more sub-systems.

Figure 2:
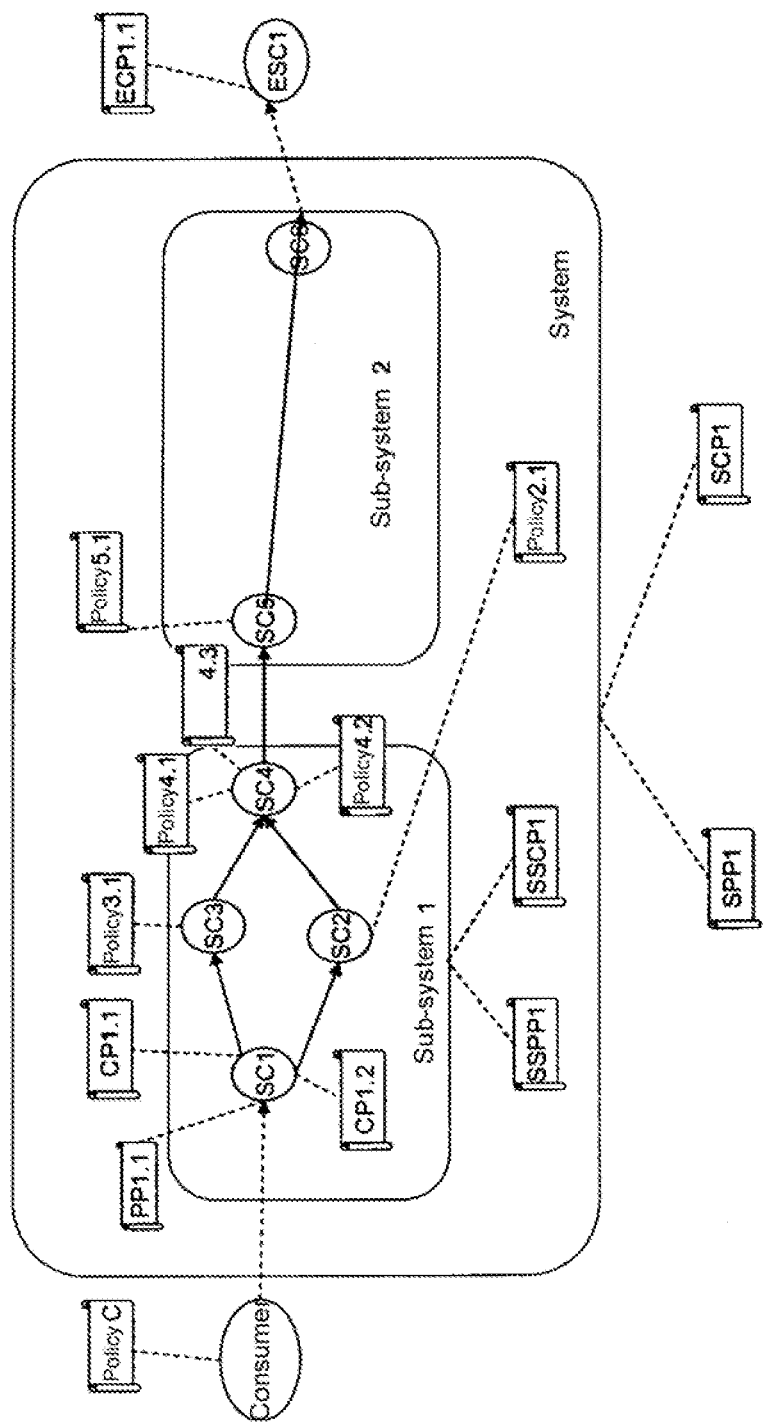
FIG. 2 illustrates an example service model in a SOA system.

A service model of a SOA system will be specifically described in the following by way of an example. FIG. 2 is an example of a service model of a SOA system. As shown in FIG. 2, the service model of the SOA system includes a plurality of logical service components SC1, SC2, SC3, SC4, SC5, and SC6, each of which can implement one or more services. The service components are connected with each other by arrows representing the dependency relationships among them. Each arrow represents the direction of service invocation from service consumer to service provider. Furthermore, in the service model of the SOA system, service components SC1, SC2, SC3, SC4 and the dependency relationships among them are associated in a sub-system 1 while service components SC5, SC6 and the dependency relationship between them are associated in a sub-system 2. Sub-systems 1 and 2 and the dependency relationship between them make up the whole system. Furthermore, it is assumed that one or more policies are specified for the service components SC1, SC3, SC4, SC5, the sub-system 1, and the system.

The service model of a SOA system in FIG. 2 is illustrative only. The particular service components, the composition of the system and the sub-systems shown are not meant to limit the form of possible service models in the present invention. There is no particular limitation on the form of service models in the present invention. Further, only 6 logical service components and 2 sub-systems are illustrated in FIG. 2 for the purpose of convenience of description. In practice, logical service models are likely to be far more complex than the model shown in the Figure. Moreover, although a logical service model is shown in FIG. 2, the method of the present invention is also appropriately applied to the physical service model. Further, in the present embodiment, the objective of Step 105 is to obtain the service model of the designed SOA system. That is, in the present embodiment, the service model of the SOA system may be obtained in any manner: it may be newly created manually, or obtained directly as a result of other pre-design-phase activities in the SOA system.

At Steps 110 through 120, vertical policy orchestration is performed on each of the plurality of service components in the service model In particular, at Step 110, a service component on which vertical policy orchestration is to he performed is selected from the service model.

At Step 115, vertical policy orchestration is performed on the selected service component. In particular, all effective policies that apply to that service component are aggregated.

Policies of a service component may comprise service provider policies where the service component acts as a service provider and service consumer policies where the service component acts as a service consumer. These policies, in particular, may be specified with respect to the operation, port, port type, and message of the service component. While aggregating effective policies for a service component, all policies specified directly for the component are taken into consideration. Further, since the policies of the system and the sub-system that the service component belongs to are also effective for the service component, while aggregating policies for the service component, the policies specified for the system and the sub-system to which it belongs are also taken into consideration.

Thus, in this step, with respect to the service component SC, the final effective policies thereof are calculated according to the following formula:

$$AP(S)=\text{Aggregate } (PP, \text{Nesting } (SSPi, \ldots SSPn), SP)$$

wherein PP is the policies specified for the service component SC, SPPi is the policies specified for the sub-system i, and SP is the policies specified for the system. Aggregate ( ) is a function that calculates the "AND" set of the policies using an algorithm defined in the web service policy attachment (WS-Policy Attachment). Nesting ( ) is a function to resolve any policy conflict between any nested sub-systems that intersect with each other. That is to say, as the service component SC belongs to a plurality of intersecting sub-systems SSP1, . . . SSPn, for the service component SC, the Nesting ( ) function cheeks and resolves any policy conflicts between nested sub-systems.

Policy conflicts between nested sub-systems in the service model may be resolved based on execution sequence, while policy conflicts between different subject levels may be resolved by assertion overriding according to subset relation among the subjects. Moreover, any policy conflict between subjects may also be resolved based on predetermined policy priority.

At Step 120, a decision is made whether or not policy aggregation has been performed on all service components in the service model. If so, the process proceeds to Step 125, otherwise it returns to Step 110 to select the next service component.

At Steps 125 through 145, horizontal orchestration is performed on the effective policies of the plurality of service components per application domain. The effective policies calculated for these service components during Steps 110 through 120 are applied in this phase, to achieve horizontal policy orchestration for the service components with dependency relationships.

In the horizontal policy orchestration phase, the following two types of policy orchestrations may be performed simultaneously or successively: simulation validation and meta-policy based orchestration.

At Step 125, simulation validation is performed to validate the policy correctness of each pair of service components with a dependency relationship. Step 125 can further be refined to three specific steps 1251, 1252, 1253.

At Step 1251, for each pair of service components with a dependency relationship, especially for each pair of service components with a fixed dependency relationship in the system and the sub-system, the consistency between the provider policies of the service component acting as a service provider and the consumer policies of the service component acting as a service consumer is checked by simulating their real peer negotiation process and generating effective policies for service invocation.

At Step 1252, for each pair of service components with a dynamic dependency relationship in the service model, by using the SLA (Service Level Agreement) predefined for consumers, the compliance with the SLA of the provider policies of the service component acting as a service provider and the consumer policies of the service component acting as a service consumer is validated.

At Step 1253, for each pair of service components with a dynamic dependency relationship in the service model, the compliance with the QoS (Quality of Service) requirements of the provider policies of the service component acting as a service provider and the consumer policies of the service component acting as a service consumer is validated by using the QoS related business policy.

It is noted that the Steps 1251, 1252, and 1253 have no mutual dependencies. Thus, the sequence in which they are performed is arbitrary. They can be performed simultaneously or successively. Furthermore, one or more of the steps may be omitted.

The second type of policy orchestration, meta-policy based orchestration, is described below. At steps 130 through 145, meta-policy based orchestration is performed on the effective policies of the plurality of service components.

At Step 130, the application domain specific meta-policies for policy orchestration in the service model are obtained.

In the present embodiment, the objective of Step 130 is to obtain the application domain specific meta-policies, but there is no particular limitation on how the meta-policies are obtained. Application domain specific meta-policies for policy orchestration may either be predefined for the corresponding application domain and stored in a meta-policy repository until needed, or may be newly defined for the application domain.

Application domain specific meta-policies for policy orchestration in the present embodiment will be described in detail in the following. Based on the nature of application domains of an SOA system, the policies of the subjects of an application domain are reliant on each other. Thus, in the present embodiment, the form of meta-policies for policy orchestration is defined to include a target relation type among service components (such as dependency relationship linkage, subset relation, etc), and any constraint for the services with target relation type.

Further, according to the requirement of policy validation, two types of meta-policies for policy orchestration are defined:
MPT1: correctness of policy presence; and
MPT2: consistency of policies.

Taking the service model of the SOA system in FIG. 2 as an example, in the case of web service reliable messaging (WS-RM), the target relation type is invocation link, and there exists the following meta-policy:
MPT1: RM(SC1, SC3)A EP(SC1, SC2, SC3)->RM(SC1, SC2)A RM(SC3)

As to the value of assertion inactiveTimeout of the WS-RM policy, if SC1, SC2 are elements of an execution path, then there exists the following meta-policy:
MPT2: L(SC1)<L(SC2)->IT(SC1)>IT(SC2)
where L (SC2) is the location of SC2 on the execution path, and IT (SC1) is the value of inactiveTimeout of SC1.

In the case of web service transaction (WS-transaction), the target relation type is subset, and there exists the following meta-policies:
MPT1: TX(SC1)A(L(SC1)<(SC2)->TX(SC2)
MPT2: AT(SS1)A Belong(SC1, SS1)->AT(SC1)

At Step 135, based on the target relation type of the meta-policies for policy orchestration, one or more service components within one application domain in the service model are specified, which, specifies the scope within which the meta-policy based orchestration will be performed in the service model.

The target relation expresses the dependency relationship among service components, which often comprises a directional link or a subset relation. In FIG. 2, for example, the following execution paths may be defined:
EP1(Consumer, SC1, SC2, SC4, SC5)
EP2(Consumer, SC1, SC3, SC4, SC5)

A specific example of a meta-policy is given below. If $Consumer_1$-the header of the path, and $Provider_n$-the tail of the path in the service model are both claimed by policies to ensure message reliability, then in order to fulfill, the reliable message requirement of consumer 1 and the provider n, it is required that all consumer/provider policies on the RMPath are in the modality of WS-RM. Thus, the application domain specific constraint on WS-RM policy attachment can be expressed by the following meta-policy:

Meta-Policy1:{Id="RMChain", Domain="WS-RM", Rule=<RM($Consumer_1$) AND RM($Provider_n$) AND Composite($Provide_i$, $Consumer_{i+1}$) AND Invoke ($Consumer_1$, $Provider_i$) AND Invoke ($Consumer_{i+1}$, $Provider_n$)->EnableRM($Provider_i$) A EnableRM($Consumer_{i+1}$), i=1, 2, . . . , n−1, wherein
$Consumer_1$=Header(RMPath),
$Provider_n$Tail(RMPath),
RMPath=Vector($Consumer_1$,$Provider_1$,$Consumer_2$, $Provider_2$, . . . , $Provider_n$)>}

In the Rule expression of meta-policy Meta-Policy1, RMPath is a model-structure with consumer/provider policies composed by standard vectors. The meaning of each WS-RM domain-specific predicate is as follows; RM will return whether the policies as parameter has modality WS-RM; Composite will return whether the policies as parameters are of the same service component; Invoke will return whether the consumer-provider policy pair is attached to services having direct or indirect invocation relationship; and EnableRM is an action to specify WS-RM modality policy to corresponding service in parameter, if the service has no such policy attached.

At Step 140, the meta-policies for policy orchestration, which are specific to the application domain including one or more selected components, are enforced on the included service components, to check the consistency and correctness of their policies.

Moreover, if a policy conflict exists, the policy conflict may be automatically resolved by the policy with higher predefined priority taking precedence over the inconsistent policy with lower predefined priority.

At Step 145, a decision is made whether or not the meta-policy based orchestration has been performed on all service components in the service model. If so, then the process proceeds to Step 150, otherwise it returns to Step 135 to select another service.

It is noted that the two types of policy orchestrations, corresponding to Step 125 and Steps 130 through 140, are not mutually dependent. Thus, the sequence in which they are performed is arbitrary. They may be performed simultaneously or successively. Furthermore, one type of policy orchestration may also be omitted.

At Step 150, one or both of a policy analysis report and the non-functional infrastructure of the service model is generated based on the result of the policy orchestrations for possible use during design and implementation phase of the service components.

In the present embodiment, the non-functional infrastructure includes the non-functional capabilities of service components, additional policy assertions, and a framework of supplemental components for non-functional infrastructure. The non-functional capabilities of service components include the non-functional features, such as the reliable messaging, transaction and security features.

The additional policy assertions could be added automatically for consistency and correctness of policies at a system level. For example, for orchestration of transaction policy, if TX (SC1) and! TX (SC2), applying MPT1: TX (SC1) A (L(SC1)<(SC2))->TX (SC2), an Atomic Transaction assertion will be inserted into the provider policies of SC2 to realize the support for an Atomic Transaction feature for TX (SC2).

The framework of supplemental components for non-functional infrastructure is generated to resolve any policy conflict that could not be automatically resolved. For example, if AT (SC4) and BA (SC5), an additional non-functional component should be generated to convert between the two different transaction types.

A method for orchestrating policies in a service model of a service-oriented architecture system according to the present embodiment is described. The present invention initially targets the particular components in the service model of the service-oriented architecture system, aggregates effective policies for them to perform vertical policy orchestration; then, depending on the defined application domains in the SOA system, performs horizontal policy orchestration per application domain.

It is possible to validate the correctness and consistency of service policies at design time of the SOA system while conducting automatic policy conflict detection/solving and generating the policy analysis report and non-functional infrastructure of the service model based on the result of the policy validation.

Figure 3:
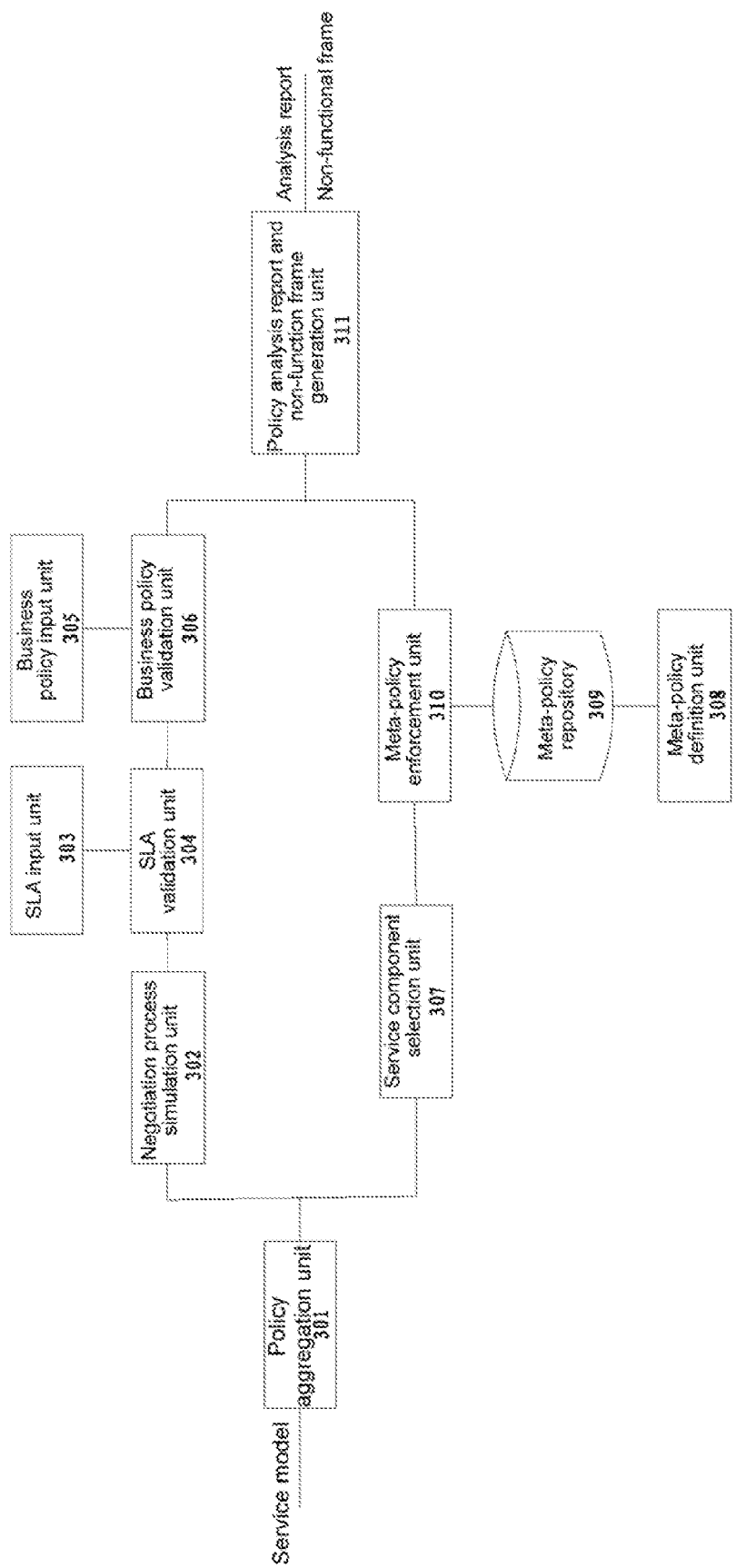
FIG. 3 is a block diagram illustrating a system for orchestrating policies in a service model of a service-oriented architecture system according to an embodiment of the present invention.

FIG. 3 is a block diagram illustrating a system for orchestrating policies in a service model of a service-oriented architecture system according to an embodiment of the present invention. As shown in FIG. 3, the system 300 for orchestrating policies in a service model of a service-oriented architecture system of the present embodiment includes: a policy aggregation unit 301, a negotiation process simulation unit 302, a SLA input unit 303, a SLA validation unit 304, a business policy input unit 305, a business policy validation unit 306, a service component selection unit 307, a meta-policy definition unit 308, a meta-policy repository 309, a meta-policy enforcement unit 310, a policy analysis report and non-function infrastructure generation unit 311.

The policy aggregation unit 301 is used for aggregating, for each of a plurality of service components in the service model, the effective policies that will be enforced on the service component. As described above, the service model comprises a plurality of service components and the dependency relationships among the service components, and at least one service component has specified policies. The policy aggregation unit 301 can operationally implement the vertical policy orchestration phase in the policy orchestration method described with reference to FIG. 1.

The negotiation process simulation unit 302 is used for, for each pair of service components with a dependency relationship in the service model, checking the consistency of the provider policies and the consumer policies by simulating their real peer negotiation process.

The SLA input unit 303 is used for inputting a predefined consumer SLA (Service Level Agreement), and converting the SLA to a form usable in the policy orchestration system 300.

The SLA validation unit 304 is used for validating, according to the input SLA, the SLA compliance of the corresponding provider policies and consumer policies of each pair of service components with a dependency relationship in the service model.

The business policy input unit 305 is used to input a predefined QoS (Quality of Service) related business policy, and to convert the business policy to a form usable by the policy orchestration system 300.

The business policy validation unit 306 is used for validating, using the QoS (Quality of Service) related business policy, the QoS compliance of the corresponding provider policies and consumer policies of each pair of service components with a dependency relationship in the service model.

The service component selection unit 307 is used for specifying one or more service components within one application domain in the service model, to thereby specify the scope of the meta-policy based orchestration in the service model.

The meta-policy definition unit 308 is used to define the meta-policies for policy orchestration for all application domains in the service model.

The meta-policy repository 309 is used for storing the application domain specific meta-policies defined by the meta-policy definition unit 308 for policy orchestration.

The meta-policy enforcement unit 310 is used for obtaining defined meta-policies from the meta-policy repository for policy orchestration specific to the application domain that includes one or more service components, and for applying the meta-policies to these service components to check the consistency and correctness of their policies.

The policy analysis report and non-functional infrastructure generation unit 311 is used for generating a policy analysis report and/or the non-functional infrastructure, according to the result of orchestration operations by said meta-policy enforcement unit 310, the negotiation process simulation unit 302, the SLA validation unit 304, and the business policy validation unit 306.

The meta-policy enforcement unit 310, the negotiation process simulation unit 302, the SLA validation unit 304, and the business policy validation unit 306 can operationally implement the horizontal policy orchestration phase in the policy orchestration method described with reference to FIG. 1, The negotiation process simulation unit 302, the SLA validation unit 304, and the business policy validation unit 306 have no mutual dependencis. Thus, the connection pattern among them is arbitrary. They may be connected in sequence or in parallel. Furthermore, one or more of the units may be omitted.

A system for orchestrating policies in a service model of a service-oriented architecture system according to the present embodiment is described. The present invention initially targets the particular components in the service model of the service-oriented architecture system, aggregates their effective policies to perform vertical policy orchestration; then depending on the definitions of application domains in the SOA system, performs horizontal policy orchestration by application domain. Thus, in the present embodiment, it is possible that the correctness and consistency of service policies is validated at the design time of the SOA system, while automatic policy conflict detection/resolution is conducted, and a policy analysis report and the non-functional infrastructure of the service model are generated based on the result of the policies validation.

Although the method and apparatus for orchestrating policies in a service model of a Service-Oriented Architecture system of the present invention have been described herein in detail, the described embodiments are not exhaustive, and various changes and modifications may be made within the spirit and scope of the present invention by those having skills in the art. Therefore, the present invention is not limited to the described embodiments and its scope is defined only by the appended claims.

What is claimed is:

1. A computer-implemented method for orchestrating policies in a service model of a service-oriented architecture system, comprising:

during a design of said service-oriented architecture system, wherein said service model comprises a plurality of service components, dependency relationships among said plurality of service components, one or more policies applicable to at least one of said plurality of service components and one or more application domains, each including service components selected from said plurality of service components:

performing vertical policy orchestration on each of the plurality of service components in said service model to obtain effective policies of the service component;

performing horizontal orchestration on effective policies of said plurality of service components per application domain, wherein performing the horizontal policy orchestration further comprises validating policy correctness of each pair of service components with a dependency relationship in an application domain; and generating at least one of a policy analysis report and a non-functional infrastructure of said service model for use in implementing said service-oriented architecture system.

2. The computer-implemented method of claim 1 further including defining one or more systems, each said system including one or more service components selected from said plurality of service components.

3. The computer-implemented method of claim 2 wherein performing vertical policy orchestration on each of the plurality of service components further comprises calculating an AND set of policies applicable to the set of service components assigned to a defined system.

4. The computer-implemented method of claim 3 further comprising:

defining a plurality of sub-systems within a defined system and assigning one or more of the service components in the system to one of the defined subsystems; and associating one or more policies with at least one of said defined sub-systems.

5. The computer-implemented method of claim 4 wherein performing vertical policy orchestration further comprises calculating an AND set of policies applicable to the set of service components assigned to a defined sub-system.

6. The computer-implemented method of claim 5 further comprising:

detecting whether or not a conflict exists between policies associated with sub-systems in a pair of defined sub-systems; and resolving any detected conflict by giving priority to one of the conflicting policies.

7. The computer-implemented method of claim 1 wherein validating the policy correctness further comprises, for each said pair of service components with a dependency relationship, simulating a peer negotiation process.

8. A computer apparatus for orchestrating policies in a service model of a service-oriented architecture system, the apparatus comprises:

during a design of said service-oriented architecture system, wherein said service model comprises a plurality of service components, dependency relationships among said plurality of service components, one or more policies applicable to at least one of said plurality of service components and one or more application domains, each including service components selected from said plurality of service components:

a vertical policy orchestration unit, for performing vertical policy orchestration on each of the plurality of service components in said service model to obtain effective policies of the service component;

a horizontal policy orchestration unit, for performing horizontal orchestration on effective policies of said plurality of service components per application domain, wherein the vertical policy orchestration unit comprises a policy correctness validation unit for validating policy correctness of each pair of service components with a dependency relationship; and a generation unit for generating at least one of a policy analysis report and the nonfunctional infrastructure of said service model for use in implementing said service-oriented architecture system.

9. The computer apparatus of claim 8 wherein:

said system comprises at least a first sub-system and a second sub-system, each having an assigned set of service components selected from said plurality of service components and one or more sub-system policies; and said vertical policy orchestration unit comprises a policy conflict resolving unit for resolving any detected conflict between policies associated with said first and second sub-systems.

10. The computer apparatus of claim 8 wherein said policy correctness validation unit further comprises a negotiation process simulation unit for checking policy consistency by simulating a peer negotiation process between a pair of service components having a dependency relationship.

11. A computer program product comprising a computer usable storage device embodying program instructions for orchestrating policies in a service model of a service-oriented architecture system, said program instructions when loaded into and executed by a computer causing the computer to:

during a design of said service-oriented architecture system, wherein said service model comprises a plurality of service components, dependency relationships among said plurality of service components, one or more policies applicable to at least one of said plurality of service components and one or more application domains, each including service components selected from said plurality of service components:

perform vertical policy orchestration on each of the plurality of service components in said service model to obtain the effective policies of the service component;

perform horizontal orchestration on the effective policies of said plurality of service components per application domain, wherein the program instructions that cause the computer to perform horizontal orchestration on effective policies of a plurality of service components per application domain comprises program instructions that cause the computer to validate policy correctness of each pair of service components with a dependency relationship in the application domain; and generate at least one of a policy analysis report and the non-functional infrastructure of said service model for use in implementing said service-oriented architecture system.

12. The computer program product of claim 11 wherein the program instructions that cause the computer to perform vertical policy orchestration on each of the plurality of service components further comprises program instructions that cause the computer to:

define at least one system;
assign service components selected from the plurality of service components to the defined system; and
calculate an AND set of policies applicable to the set of service components assigned the defined system.

13. The computer program product of claim 12 further including program instructions that cause the computer to:

define a plurality of sub-systems within a defined system;
assign one or more of the service components in the defined system to one of the defined subsystems; and
associate one or more policies with at least one of said defined sub-systems.

14. The computer program product of claim 13 wherein the program instructions that cause the computer to perform vertical policy orchestration further comprises program instructions that cause to computer to calculate an AND set of policies applicable to the set of service components assigned to a defined sub-system.

15. The computer program product of claim 14 wherein the program instructions that cause the computer to perform vertical policy orchestration in a sub-system further comprises program instructions that cause the computer to:

detect whether or not a conflict exists between policies associated with sub-systems in a pair of defined sub-systems; and
resolve any detected conflict by giving priority to one of the conflicting policies.

16. The computer program product of claim 11 wherein the program instructions that cause the computer to validate the policy correctness of a pair of service components further comprises program instructions that cause the computer to simulate a peer negotiation process.

17. The computer program product of claim 16 wherein the program instructions that cause the computer to validate the policy correctness of a pair of service components further comprises program instructions that cause the computer to:

retrieve a predefined Service Level Agreement;
read the predefined Service Level Agreement; and
determine whether the policy associated with the pair of service components conforms to the requirements of the predefined Service Level Agreement.

* * * * *